Figure 1:
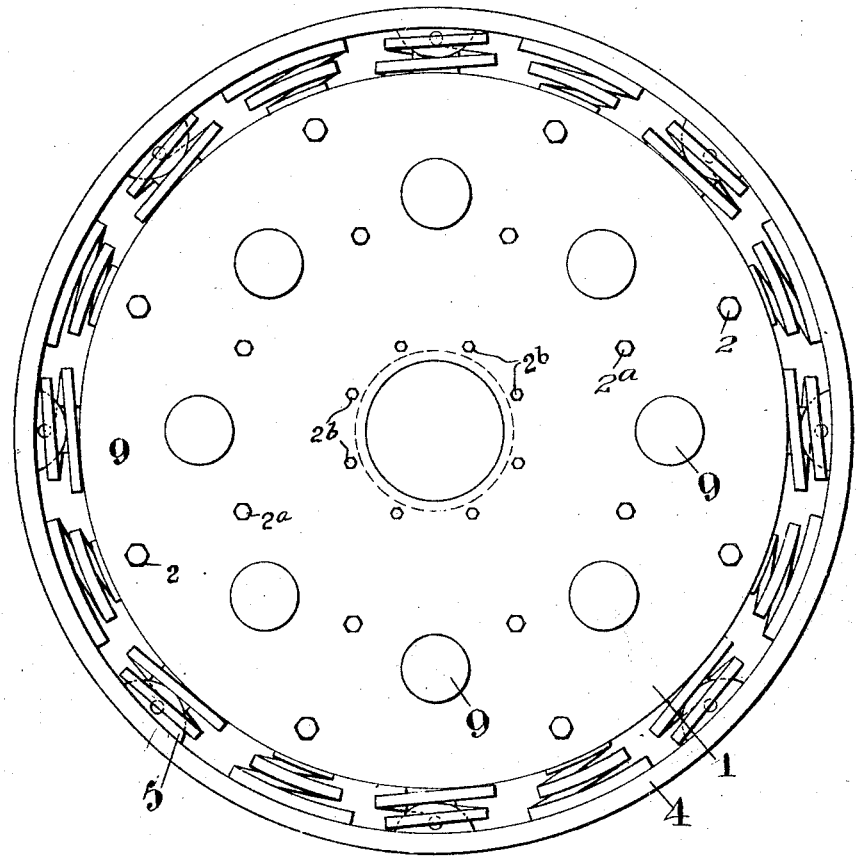

May 10, 1927.  H. HILL  1,628,594
SPRING WHEEL FOR AUTOMOBILES AND OTHER VEHICLES
Filed July 16, 1924    3 Sheets-Sheet 1

Inventor
H. Hill
By Marks & Clerk
Attys.

May 10, 1927. 1,628,594
H. HILL
SPRING WHEEL FOR AUTOMOBILES AND OTHER VEHICLES
Filed July 16, 1924 3 Sheets-Sheet 2
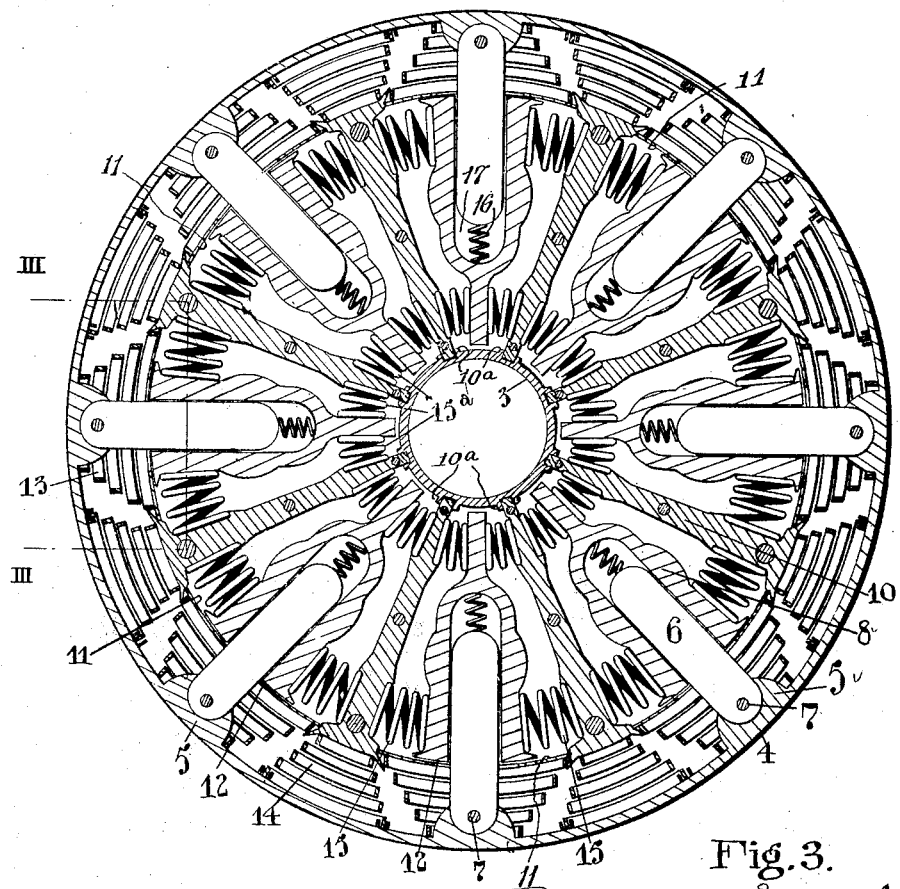

May 10, 1927.

H. HILL 1,628,594

SPRING WHEEL FOR AUTOMOBILES AND OTHER VEHICLES

Filed July 16, 1924  3 Sheets-Sheet 3

Inventor
H. Hill
by Marks & Clerk

Patented May 10, 1927.

1,628,594

UNITED STATES PATENT OFFICE.

HERBERT HILL, OF DURBAN, NATAL, SOUTH AFRICA.

SPRING WHEEL FOR AUTOMOBILES AND OTHER VEHICLES.

Application filed July 16, 1924, Serial No. 726,395, and in Great Britain April 17, 1924.

This invention relates to spring wheels for automobiles and other vehicles and has for its object to provide improvements therein.

The invention consists broadly in a spring wheel having an inner rim element, an outer rim element, a central element, side plates connected to the central element and extending towards the inner rim element, telescopic radial elements connecting the hub with the outer rim element, said telescopic radial elements being pivotally connected with the side plates about axes located at equal distances apart on a circle whose centre is the axis of the wheel, resilient devices located between the outer and inner rim elements and fixed non-extensible radial members connecting the inner rim element and the central element of the wheel.

In a preferred construction of wheel in accordance with the invention, the wheel comprises disc elements spaced apart and secured to a central element adapted to encircle the vehicle axle, radial members rigidly secured to the said central element and located between the disc elements, an inner rim element secured to the ends of the said radial elements connecting together the outer ends thereof, telescopic radial elements, each comprising a portion forming a lever and pivotally connected to the disc elements and a further portion slidable within the first-mentioned portion pivotally connected with the outer rim, and springs located between the inner and outer rim elements adapted to oppose the action of the load upon the wheels to displace the axes of the rim elements.

Between the fixed radial elements and the radial elements which are pivotally mounted spring elements, may be arranged and if the one portion of each of the pivotally mounted radial elements is formed as a lever of the first order, such springs may be located adjacent to either end of the lever while in the other case, that is to say where the one portion of the element is pivoted adjacent to its inner end in the side disc, springs will be located adjacent to the outer end of the lever only.

Optionally, within a chamber formed in one portion of each of the telescopic radial elements metal springs or other resilient means may be located adapted to constrain the inner elements to move outward from the axis of the wheel.

The invention will be further described with reference to the accompanying drawings, illustrating by way of example two convenient constructions:—

Figure 5:
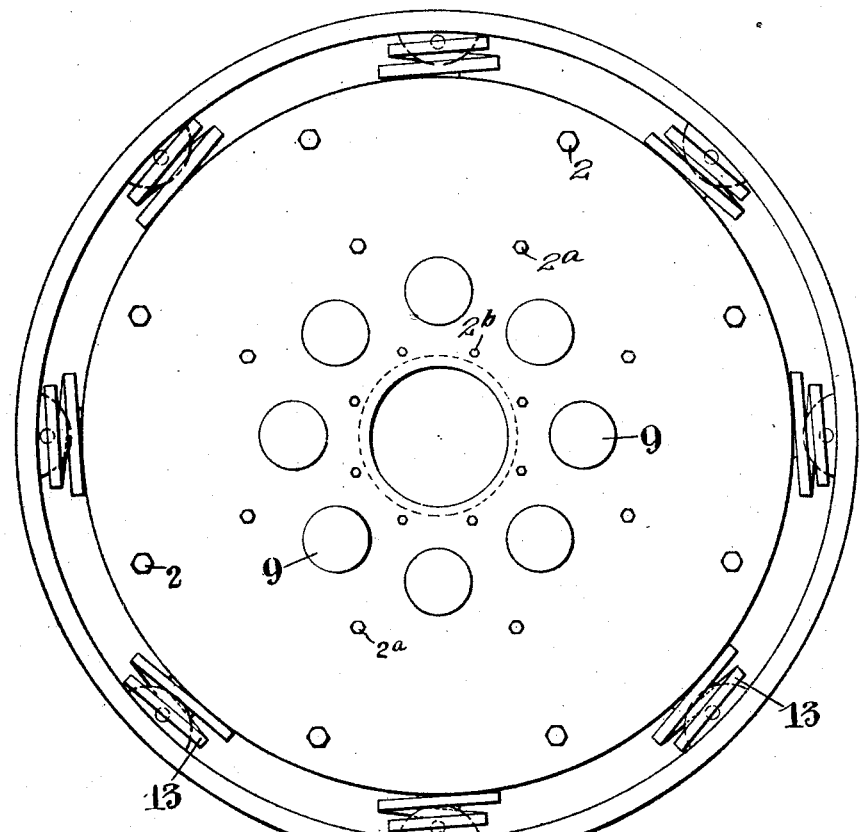
Figure 6:
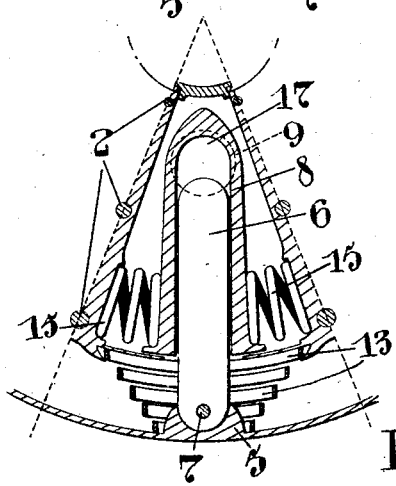

Figure 1 being an external elevation of one construction;

Figure 2 a sectional elevation thereof;

Figure 3 a section on the lines III—III of Figure 2;

Figure 4 a section through one of the radial members of a second construction;

Figure 5 is an outside elevation of a third construction;

Figure 6 being a fragmentary view in sectional elevation of the construction illustrated in Figure 5, and Figure 7 a fragmentary view illustrating a detail which may be incorporated in a device in accordance with the invention, while Figure 8 is a fragmentary plan view of the inner ring element.

In all the constructions, the side plates, which are indicated by the reference 1 in Figure 1 and by the reference 1$^a$ in Figure 5, are connected together by bolts 2, 2$^a$, 2$^b$; 3 is a central element or shell adapted to encircle the nave of the wheel; 4 the outer rim or tyre on which at intervals bosses 5 are formed by means of which members 6 of the telescopic radial elements are pivotally connected by pivots 7 to the rim, 8 being the portions of these telescopic elements within which the aforesaid members are arranged to slide. These portions of the telescopic elements are provided with pivots 9 engaging in holes formed in the side plates.

In the construction illustrated in Figures 1 to 3, the pivots are located about half-way between the central shell and rim of the wheel, while in the construction illustrated in Figures 5 and 6 they are located adjacent to the central portion of the wheel. In the one case, therefore, these elements act as levers of the first order. To the central element adapted to encircle the vehicle axle or a hub mounted thereon, radial elements or spokes 10 are rigidly connected at their inner ends by being engaged in recesses and between the shoulders 10$^a$ on the central element, their outer ends being rigidly connected by welding to a ring 11 in which apertures 12 are provided adapted to permit of the telescopic radial members moving about their pivotal connections with the side plates.

Between the tyre or outer rim of the wheel and the same springs 13 are located, such springs encircling the outer ends of the telescopic radial members. Other springs 14, as indicated in Figure 2, may also be interposed between the ring above referred to and the outer rim or tyre of the wheel. Between the fixed radial elements and the telescopic pivotally mounted elements springs 15 are arranged adjacent to the outer ends of the former while in the construction illustrated in Figures 1 to 4 springs 15ª are also located between the inner ends of the fixed radial elements and the adjacent ends of the telescopic and pivotally mounted radial elements.

A spring 16, as shown in Figure 2, may also be located within the chamber 17 in each of the radial members adapted to assist in taking up the load on the wheel.

Conveniently, the outer rim is provided with flanges or annular plates adapted to fit close against the side plates and thus exclude dust from the mechanism.

In the construction illustrated in Figure 4 the annular plates are indicated by the reference 18 and the rim in this case is in the form of a channel member provided with a central web 19 and flanges 20 to which the outer extremities of the radial members are pivotally connected. With this construction cross webs may be provided at intervals connecting the central web and the flanges, and a band tyre 21 may be applied to the rim in this as also in the other constructions described.

In Figure 7 the end of the radial member is provided with projections 22 adapted to contact with rubber pads or cushions 23 in the event of excessive movement of the radial member about its pivot.

While in the above the provision of bosses on the inner surface of the outer rim or tyre is described for the purpose of securing connection between the outer ends of the telescopic radial members and the same, recesses may, as an alternative, be provided in said member within which the ends of the telescopic members may be pivoted.

Having now described my invention, what I claim as new and desire to secure by Letters Patent is:—

1. A spring wheel having an inner rim element, an outer rim element, a central element, side plates connected to the central element and extending towards the inner rim element, telescopic radial elements connecting the hub with the outer rim element, said telescopic radial elements being pivotally connected with the side plates about axes located at equal distances apart on a circle whose centre is the axis of the wheel, resilient devices located between the outer and inner rim elements and fixed non-extensible radial members connecting the inner rim element and the central element of the wheel.

2. A spring wheel having an inner rim element, an outer rim element, a central element, side plates connected to the central element and extending towards the inner rim element, telescopic radial elements connecting the hub with the outer rim element, said telescopic radial elements being pivotally connected with the side plates about axes located at equal distances apart on a circle whose centre is the axis of the wheel, resilient devices located between the outer and inner rim elements, fixed non-extensible radial members connecting the inner rim element and the central element of the wheel, and resilient means arranged between the fixed non-extensible radial elements and the telescopic radial elements adapted to permit a limited degree of relative rotational motion between the outer rim element and the central element of the wheel.

3. A spring wheel, comprising disc elements spaced apart and secured to a central element adapted to engage a hub on a vehicle axle, non-extensible radial members rigidly secured to the said central element and located between the disc elements, an inner rim element secured to the ends of the said radial elements connecting together the outer ends thereof, telescopic radial elements, each comprising a portion forming a lever and pivotally connected to the disc elements and a further portion slidable within the first-mentioned portion pivotally connected with the outer rim, and springs located between the inner and outer rim elements adapted to oppose the action of the load upon the wheels to displace the axes of the rim elements.

4. A spring wheel as claimed in claim 3, in which one portion of each of the pivotally mounted radial elements is formed as a lever of the first class and springs are located adjacent to either end of the lever and between the same and the fixed radial elements.

In testimony whereof I have signed my name to this specification.

HERBERT HILL.